United States Patent [19]

Ross

[11] Patent Number: 4,627,923
[45] Date of Patent: Dec. 9, 1986

[54] APPARATUS AND METHOD OF FILTERING SOLIDS FROM A LIQUID EFFLUENT

[75] Inventor: David S. Ross, Lorain, Ohio
[73] Assignee: International Tectonics Incorporated, Avon Lake, Ohio
[21] Appl. No.: 652,873
[22] Filed: Sep. 20, 1984
[51] Int. Cl.$^4$ .............................................. B01D 23/24
[52] U.S. Cl. .................................. 210/744; 134/25.1; 210/86; 210/108; 210/274; 210/279; 210/758; 210/786; 210/795
[58] Field of Search ............... 134/25.1; 210/744, 758, 210/786, 792, 793, 794, 795, 807, 86, 106, 108, 274, 275, 277, 279

[56] References Cited

U.S. PATENT DOCUMENTS

| | | | |
|---|---|---|---|
| Re. 28,458 | 7/1975 | Ross | 210/792 |
| 1,818,638 | 8/1931 | McGill | 210/189 |
| 2,538,340 | 1/1951 | Tomek et al. | 210/792 |
| 2,710,692 | 6/1955 | Kegel et al. | 210/274 |
| 2,785,123 | 3/1957 | Stroud | 210/636 |
| 2,826,306 | 3/1958 | Burns | 210/115 X |
| 2,888,140 | 5/1959 | Herbert | 210/275 |
| 3,412,863 | 11/1968 | Stuart, Sr. | 210/793 |
| 3,428,177 | 2/1969 | Duff | 210/108 |
| 3,459,302 | 8/1969 | Ross | 210/796 |
| 3,506,125 | 4/1970 | Willis | 210/274 |
| 3,516,930 | 6/1970 | Ross | 210/694 |
| 3,530,988 | 9/1970 | Smith | 210/275 X |
| 3,574,329 | 4/1971 | Beavon | 210/794 |
| 3,587,861 | 6/1971 | Ross | 210/277 |
| 3,613,888 | 10/1971 | Harris | 210/794 |
| 3,792,773 | 2/1974 | Ross | 210/712 |
| 3,817,378 | 6/1974 | Ross | 210/275 X |
| 3,840,117 | 10/1974 | Ross | 210/794 |
| 4,032,443 | 6/1977 | Ross | 210/275 X |
| 4,127,485 | 11/1978 | Baker et al. | 210/169 |
| 4,196,079 | 4/1980 | Ward | 210/794 |
| 4,202,774 | 5/1980 | Kos | 210/279 X |

FOREIGN PATENT DOCUMENTS 949882 9/1956 Fed. Rep. of Germany .
298867 12/1954 Switzerland .

OTHER PUBLICATIONS

Henkelekian & Balmat, Chemical Composition of the Particulate Fractions of Domestic Sewage, 31 Sewage & Industrial Wastes, 413 (1959).
Balmat, Biochemical Oxdiation of Various Particulate Fractions of Sewage, 29 Sewage & Industrial, 757 (1957).

Primary Examiner—Richard V. Fisher
Assistant Examiner—W. Gary Jones
Attorney, Agent, or Firm—Body, Vickers & Daniels

[57] ABSTRACT

There is provided an improvement in a waste effluent filter of the type including a tank, a generally flat fine mesh screen over the lower portion of the tank to define an underdrain cavity below the screen and a filter bed of particulate material having an upper surface and a lower general surface adjacent the underdrain cavity. The particle size of the particulate material being greater than the size of the apertures in the fine mesh screen. The filter improvement includes a jet creating grid for creating a plurality of upwardly directed hydraulic jets evenly distributed throughout the filter bed during the filtering of the effluent through the bed wherein the jet creating grid includes a plurality of nozzles in the bed itself substantially below the upper surface of the bed and above the fine mesh screen a selected distance to retain the lower layer of the bed undisturbed. As a further improvement a plurality of horizontal liquid jets are created as a network over the upper surface of the sand bed to scour the media surface during filtering. A further improvement in the filter is the creation of a plurality of hydraulic cleaning jets usable during backwashing along with a vertical flushing action through the screen from the underdrain cavity. Yet a further improvement in the filter is the provision of a chemical cleaning feature utilizing two separate and distinct chemicals injected into the bed for cleaning the filter bed. Preferably, the chemical injection uses the two sets of vertically displaced jets.

45 Claims, 21 Drawing Figures

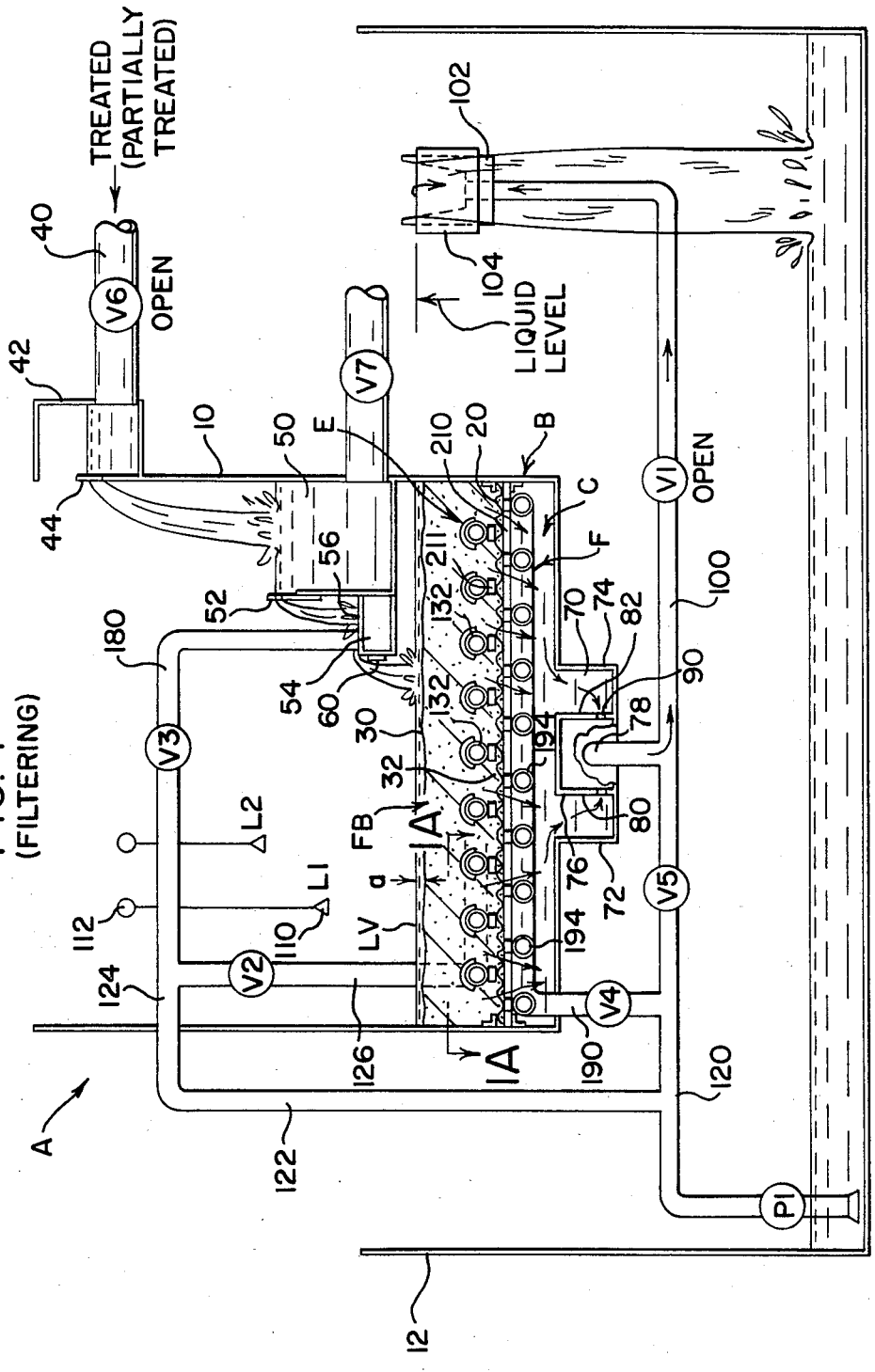

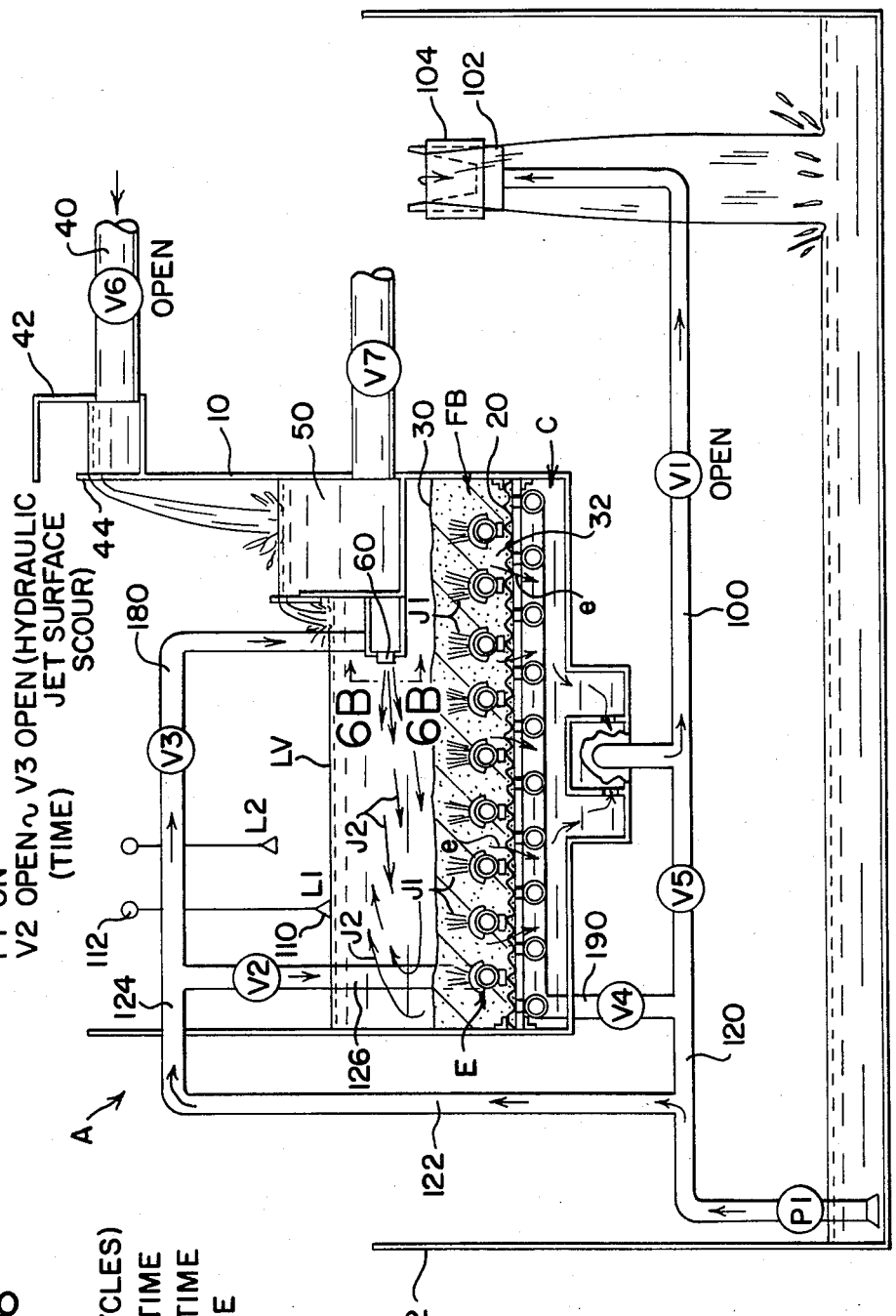

LEVEL ≥ L2 (BACK WASH)
P1 ON V1 CLOSED
V4 OPEN (SCREEN JET)

(BED IS SUBFLUIDIZED)

V4 OPEN (LOWER JETS) (FIG. 11)
TIME T1
V2 OPEN (UPPER JETS) (FIG. 7)
V5 OPEN (SCREEN FLUSH)
V2 CLOSED

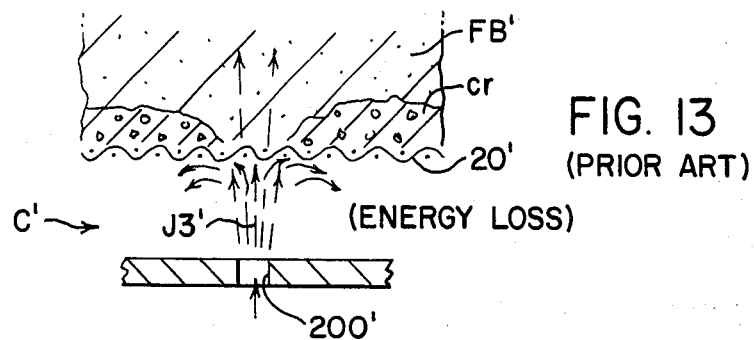
FIG. 13 (PRIOR ART)
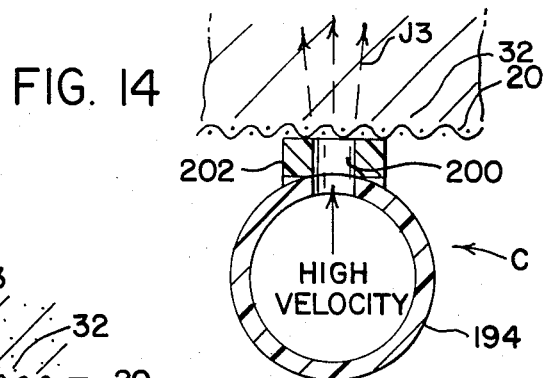
FIG. 14
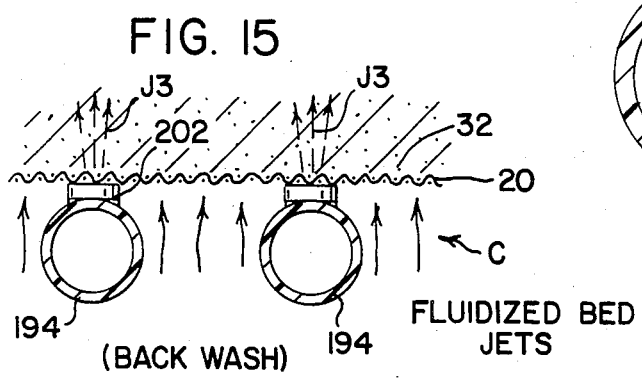
FIG. 15
FIG. 17
- I  P1 ON V4 OPEN (V5 CLOSED)(V1 CLOSED)
- II  V2 OPEN
- III  V2 CLOSED V5 OPEN (V3 ON)
- IV  V5 CLOSED V2 OPEN
- V  V2 CLOSED V4 CLOSED
- VI  SOAK
- VII  BACK WASH

APPARATUS AND METHOD OF FILTERING SOLIDS FROM A LIQUID EFFLUENT

The present invention relates to the art of sand filters of the type used for waste water treatment and, more particularly, to an improved method and apparatus of filtering solids from a liquid effluent which can filter a wide range of particles from an incoming liquid effluent without allowing passage of large volumes of small particles during either filtering or backwashing.

INCORPORATION BY REFERENCE

Applicant's prior U.S. Pat. Nos. 3,459,302; 3,516,930; 3,587,861; 3,792,773; 3,817,378; 3,840,117: 4,032,443; and, Re. 28,458 are incorporated by reference herein as background information. A December 1982 article in the Journal of Water Pollution Control Federation, pages 1581–1591 and entitled "Filtration of Primary Effluent" authored, in part, by applicant, is also incorporated by reference herein as background information to the present invention.

BACKGROUND

The present invention is particularly applicable for filtering solids from a treated, or partially treated, waste stream prior to further treatment or discharge to a receiving stream or repository, and it will be described with particular reference thereto; however, it is appreciated that the invention has much broader applications and may be used in many installations and applications wherein effective removal of both fine, small and large particles is desired and/or required.

Waste water effluent has a large range of particles which must be removed if a sand filter of the type disclosed in prior patents is to be effectively used for filtering untreated or partially treated effluent. The particles which must be removed by the sand filter can be generally classified as discrete, gelatinous, fibrous, biotic particles and/or a variety of these combinations of these various particles having various sizes. These sizes can vary from microscopic to macroscopic. The organic portions of these many and diverse deleterious materials require oxygen and are designated as having a certain oxygen demand over a specific time, normally five days. This $BOD_5$ remaining in the filtrate is deleterious to various water repositories into which a sand filter effluent is to be deposited. As indicated in the article incorporated by reference herein, sand filters used for waste water treatment have been effective for removal of particles greater than about two microns in size. Under this size, prior sand filters used for waste water filtering have had only slight effectiveness. This fact has seriously limited, if not completely incapacitated, prior sand filters from being used for primary treatment of waste water effluent and for treating other relatively high particle loaded effluent. Consequently, particle size below about one micron was often assumed to be a soluble solid and ignored. This led to the less than effective operation of many prior art sand filters used for tertiary treatment of waste water effluent even though published information documented large particle effectiveness. Good sand filters still allowed release of smaller particles often of the colloidal or supercolloidal size.

For some time, it has been known that the biological reaction rate in effluent increased with the reduction in the particle size of the filtered effluent. Knowing that, it has always been the objective to remove as many particles of the smallest size as can be removed from a filtered effluent. Consequently, efforts were made to remove smaller and smaller particles from the sand filtering process when treating waste effluent. This desire to remove still smaller particles has caused a large number of filter design concepts in the filtering art.

Many filtering systems have been developed and used in the filtering of treated or partially treated waste effluent with only limited success. For instance, relatively deep bed large granular particulate material has been used. The interstices in this type of bed were extremely large and permitted entry of small particles. Surface attraction of the particles to the media and physical wedging of the particles between the large granular material forming the media of the bed were both mechanical features relied upon for particle removal as effluent flowed through the bed. As more particles were lodged in the bed, the size of the interstices was reduced. Smaller flow paths increased the velocity of the effluent flowing through the bed to sweep off organic materials attracted to the surfaces of the particles. For that reason, these large particles, deep bed filters had only a limited effectiveness in the separation of organic substances from the waste effluent, but they were somewhat effective in removing discrete larger particles. Small particles were separated by surface attraction; therefore, they were ultimately stripped from the surface of the particles as the velocity of flow through the filter increased with increased loading. Consequently, the deep bed large granular material was not effective for waste water treatment.

Smaller grain media for the filter bed was used in an attempt to improve particle removal. Small interstices blocked passage of small suspended solids. Indeed, most particles were separated at the upper surface of the filter bed. As soon as that happened, the upper surface was coated and the interstices of the upper surface were blocked. This blockage occurred rapidly and limited filter runs. Indeed, often the filter run was so short that the filter could not accumulate sufficient filtered effluent for the purposes of a subsequent backwashing. This deficiency of fine grain sand filters often required additional water supplies or bypass of the sand filter itself after a short time. As can be seen, coarse grain filter beds resulted in limited small particle removal from the effluent; however, the filter runs were relatively long due to the large interstices available. To reduce the amount of particles passing through the filter, media was decreased in size. This did allow removal of more solids and thus decreased the output biological load; however, the filter runs were so short as to be unacceptable.

To solve these problems, it was suggested that several layers of media could be provided in the bed so that particles would first pass through a relatively large or coarse grain layer and then progressively move through smaller interstices at lower media levels. Such filters were not acceptable because they intermixed at the interface and packed the fine particles within the interstices of the coarse particles. This was more pronounced following backwashing which is generally performed by flowing filtered effluent in a reverse direction through the filter bed.

Effective filtration of effluent with only partial treatment, such as waste water and/or surface water, has presented a major challenge through the years for sand filters and this challenge remains today. Studies of waste water characteristics reveal that an effective filter must be able to remove a wide range of particles both of various sizes and various volumes in the effluent. These filters, although not now generally recognized or not even available, should remove colloidal and super colloidal solids that exist in waste water and are generally below a preselected size. These small particles present a significant polluting load which was ignored as a form of particles, but now can be removed by use of the improved filter and method of operation of the present invention.

Before defining the improvement in the present invention, it is recognized that many of the shortcomings of sand filters were overcome by the prior patents incorporated by reference herein as background information. This total filtering technology was of substantial commercial value and allowed fine grain sand to be used for long filter runs to effectively remove particles from waste water effluent. Even though these filters were substantial advances in the art, they still had certain disadvantages that precluded them from being used successfully for removal of smaller particles and for treatment of heavily loaded primary and secondary effluent. These prior filters, as a general technology, included a vented underdrain to develop a volume of air which was exhausted during backwashing and pulsing to extend the filter run. The air forced up through the media during filtering dislodges particles held on the surface of the sand and with a size finer than the physical passages of the interstices of the granular bed. The magnitude of this release of these fine particles is dramatically illustrated in the previously mentioned article entitled "Filtration of Primary Effluent" directed to the prior air pulsed filters. Although not generally recognized, the polluting load of the effluent was increased by release of fine particles by a factor inversely related to reduction of particle size in the outcoming filtered effluent. Consequently, these prior filters, although improvements, did somewhat encourage high velocity channeling through the sand bed, since the flow velocity through the bed is a function of porosity and gravity. As the porosity decreased with trapped particles, the flow velocity increased. Conseqeuntly, air turbulence caused by air forced from the underdrain dislodged the fine particles from the grains during upflow of air from the underdrain. This air also caused rupture of the sand in areas of least resistance to cause certain amount of problems in continued pulsing and operation in a given filtering cycle.

Prior units did not clean the lower support screen evenly during backwashing leaving crusted matter on the screen.

All of these problems and difficulties faced by sand filters as disclosed in the prior art patents are overcome by the present invention.

INVENTION

The present invention relates to an improved waste water filter apparatus and the method of operating this improved filter, which improved filter overcomes the disadvantages of the prior art and provides a filter which removes a substantial amount of small particles, including colloidal and super colloidal particles, without losing these particles during regeneration of the surface of the filter for the purposes of increasing the filter run. The improvement in the technology of sand filter application allows use of the sand or other media filter for primary effluent, dirty effluent even through secondary, and surface waters, as well as other applications for filtering highly loaded incoming effluent. The term "waste effluent" incorporates all of these various types of effluent to be treated effectively by a filter including the improved features which are the subject matter of the present invention.

In accordance with the improvements of the present invention, high velocity channeling is eliminated by a novel concept for flooding the underdrain by selecting a minimum liquid level generally over the surface of the sand bed. In accordance with this aspect of the present invention, this minimum level is controlled with an outlet weir which is adjustable vertically to allow flow into the filtrate or holding tank in a manner to create a preselected minimum head over the filter bed. When the term "over" is used, it is appreciated that the head may be slightly below the upper surface of the bed. By using this relatively simple adjustment, high velocity flow onto the filter bed is possible because of the liquid distribution followed by the minimum liquid level within the filter bed. This flooding of the filter bed and underdrain also eliminates channeling and allows the bed to be used for storage of solids in accordance with the primary aspect of the present invention which will be described later. A further advantage of this particularly simiple concept for adjusting the minimum level of liquid in the bed is that it allows capture of particles deeply into the body of the filter bed. The bed forms a storage vessel for particles removed by the sand surface.

The primary aspect of the present invention is the improvement of a waste water sand type filter by regenerating the upper filtering surface periodically during the filter run. In accordance with this aspect of the invention, a plurality of vertical hydraulic jets are created within the bed, but they are located at a level away from the bottom support member or screen in the bed. These jets can be periodically operated to fold dirt from the upper surface into the bed where it can be accumulated for subsequent backwashing. This technique of utilizing jets from a position spaced above the lower screen permits storage of substantial solids within the bed itself, while retaining a relatively clean media over the top surface of the filter bed. This repeated regeneration of the upper surface is a substantial advantage. The filtering action of a fine grain bed filter generally takes place at the upper portion where the fine grain particles block most suspended solids. Repeated operation of the hydraulic jets permits continued use of the bed for storage of solids and continued use of surface regeneration, while retaining a lower undisturbed filter layer of sand or filter media. Thus, there is no breakthrough in the filter itself to allow downward movement of fine particles. This prevents the inclusion of fine particles into the filtrate holding tank, which action substantially reduces the polluting load of the filtered effluent. In this manner, a plurality of upwardly directed hydraulic jets evenly distributed throughout the total volume of the sand bed are selectively actuated during filtering of the effluent through the filter bed so that these jets are originated above the lower screen. This retains a lower layer of the sand bed generally undisturbed during the total filter run. Such undisturbed lower level assures a filter layer to prevent fine particles from breaking through the filter during periodic surface regeneration.

Another improvement in the present invention is the provision of an arrangement for scouring the upper surface of a filter, which arrangement involves a series of hydraulic jets that sweep over the top surface of the filter bed creating entraining velocity liquid flow which flow lifts and scours the upper surface of the filter bed during the filter runs. This system can be energized during backwashing to provide additional liquid currents in the bed during backwashing. These hydraulic jets are evenly spaced transversely across the filter bed just above the surface and are created by normally submerged nozzles in the form of a plurality of transversely spaced openings of a distribution conduit. These hydraulic jets do not depend upon relative density or fluid depth to create currents over the surface of the sand bed for the purposes of lifting and entraining at least the larger particles accumulated on the surface of the filter bed.

Yet another aspect of the present invention involves the use of hydraulic jets, during the backwashing cycle, from nozzles or other jet creating means immediately below the screen, i.e. directly below and contacting the screen supporting the bed. These upwardly directed liquid jets are used during a backwashing cycle to grind up grease accumulations and to loosen the sand grains from each other preparatory to backwashing by pumping filtered effluent into the underdrain cavity and through the bed. This backwashing flow through the screen is at a rate sufficient to fluidize the filter bed by flow of liquid up through the bed supporting mesh or screen. This flushes the screen. The combination of the jets and this flushing of the screen disrupts the layer of media which was undisturbed during filtering and combine with the upwardly moving liquid during backwashing to agitate the fluidized bed created by flow velocity of the backwashing liquid. The combined flushing and jet action thoroughly cleans and flushes the screen surface, washes the previously undisturbed layer of media supported on the screen surface and allows washing of the sand by a continuously upwardly moving flow of liquid to prevent any applicable downflow of fine or gross particles that may have accumulated on or at the screen during either filtering or backwashing. The combination of the flushing action through the screen and the jet auguring caused by the jets immediately below the screen causes an effective media scrubbing action during the backwashing operation. To allow this high velocity upward flow of liquid, without localized bed disruption caused by a difference in the up flowing velocity gradient, the underdrain cavity is provided with a novel and improved distribution system including a double gullet type distribution system that changes the direction of flow of filtered effluent forced into the underdrain during backwashing. Flow of the effluent coming into the gullet passes through a series of orifices which are perpendicular to the axis of the incoming fluid flow to further decrease energy based upon flow velocity. This novel double gullet arrangement allows even distribution of incoming backwash effluent for the purpose of having a relatively high uniform velocity through the bed. This allows fluidization of the bed, which combines with action of at least the lower jets to greatly improve the overall backwashing cycle of the filter. Of course, the upper jets and surface scouring jets could be employed during the backwashing cycle to provide further more agitated cleaning of the fluidized bed. This jet action prevents stratification as the bed settles down into its filtering mode. To further tune or adjust the velocity gradient of the flow distribution pattern, one or more energy absorbing, adjustable vanes are provided in the double gullet to absorb energy in the direction of incoming flow parallel to the gullet. The adjustable position of the vane or vanes further prevents disruption primarily at the far end of the filter opposite to the end of the elongated gullet accepting the backwashing liquid.

Still a further aspect of the invention is the combination of one or more of the features mentioned above in a total sand filter that allows the resulting improved filter to remove a substantially increased amount of small particles as well as more large particles while still allowing long filter runs by the surface regeneration and/or surface scouring techniques. Consequently, the polluting load of the filtered effluent to be directed to a repository stream is decreased. This is a substantial advantage in the filtering art. In addition, longer filter runs are allowed without tendency to lose fine particles during surface regeneration. In addition, the hydraulic jets do not introduce air patterns which can cause downward breakthrough of fine particles into the underdrain cavity. These are certain advantages obtained by incorporating one or more of the aspects of the present invention described above.

As discussed in the prior U.S. Pat. No. 4,032,443, after a series of filter runs and backwashing cycles, it may be necessary to clean grease and other contaminants from the filter bed to rejuvenate its filtering action, especially the surface attraction by the individual particles. In accordance with the present invention, there is provided an improved method of cleaning the filter which includes essentially agitating the filter with the existing jets and then forcing a liquid surfactant or wetting agent into the bed. Thereafter, an oxidizing agent is forced into the bed to clean the grease or other contaminants from the surfaces of the various particles without requiring mixing external of the bed itself. This dual chemical system utilizes an oxidant and surfactant. Chemicals can be pumped into the media bed directly without any dilution or uneven distribution over the media surface. Also, it is not necessary to force the chemicals from the lower portion through the underdrain cavity. These are all advantages over existing systems and methods for chemically cleaning particulate filter beds of the type to which the prior art patents are directed and to which the present invention is also directed. By using the existing jets, the filter bed is fractured by pumping filtrate through the bed prior to the introduction of chemicals into the bed. This agitation can be by air or liquid since the filter is not in a filtering operation and the chemical clean is followed by a standard backwashing cycle. By utilizing a fracturing cycle frist, the surfactant spreads evenly into and throughout the entire media bed from both the upper and lower jets. Following the introduction of the surfactant, the oxidant or oxidizing agent is them pumped into the same passages which allows deep penetration of the oxidant or oxidizing agent into the interstices of the previously fractured bed. The pumping cycle can be repeated for the upper and lower sets of jets after both chemicals have been injected into the bed. By this improved method, chemicals are not diluted to reduce their effectiveness preparatory to being introduced into the bed itself. In addition, they are not mixed together before they are placed in the bed which could cause rapid reaction and further diminution of their effectiveness. The chemical cleaning cycle as described above can be repeated and is followed by a backwash cycle to thoroughly wash out grease and other deleterious materials remaining in the filter bed. The multiple jetting action together with the dual nature of the introduction system allows this chemical cleaning method to be substantially more effective in removing grease than heretofore available to the art of sand filters for waste effluents.

The various objects and advantages of the present invention have been described above and will be explained in connection with the description of the preferred embodiment of the invention; however, as an overall advantage, the present invention allows a sand filter to be used in filtering highly contaminated effluent, either treated or partially treated, while still maintaining a low level of particulates in the filtered effluent, long filtering runs and efficient backwashing with or without chemical cleaning.

Other objects and advantages will become apparent in the description in which the drawings used are defined in the next section.

BRIEF DESCRIPTION OF DRAWINGS

FIG. 1 is a somewhat schematic side elevational view showing the preferred embodiment of the present invention;

FIG. 6 is a view similar to FIG. 1 illustrating the preferred embodiment of the present invention during continuation of the filtering operation shown in FIG. 1, wherein effluent has increased to at least the level L1 and showing operation of a first network of jet producing nozzles;

FIG. 13 is an enlarged, partial diagrammatic illustration of prior art nozzle operation;

FIG. 14 is a diagram similar to FIG. 13 illustrating the nozzle means employed in the present invention;

FIG. 15 is a diagrammatical view showing the lower nozzles and fluidized bed employed during the backwashing operation of the preferred embodiment;

PREFERRED EMBODIMENT

Figure 3:
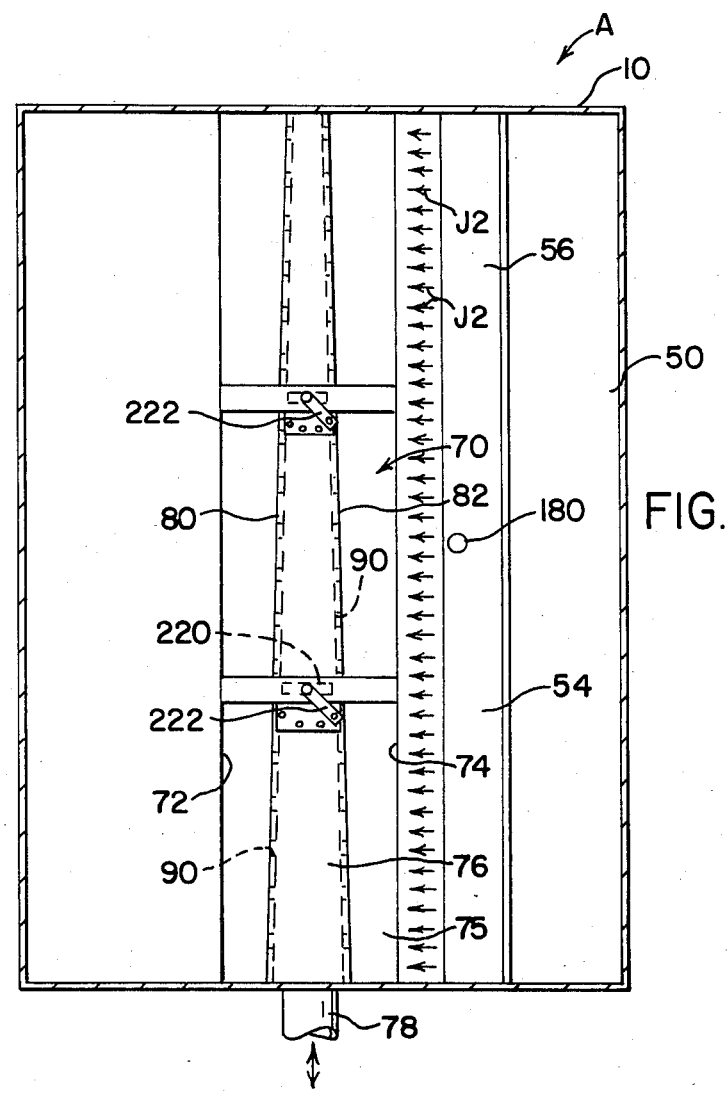
FIG. 3 is a top plan view showing compartments of a filter constructed in accordance with the present invention using a gullet as illustrated in FIGS. 2 and 2A.

Referring now to the drawings wherein the showings are for the purpose of illustrating a preferred embodiment of the invention only and not for the purpose of limiting same, FIG. 1 shows a fine grain type sand filter A including a tank 10 constructed adjacent to or integral with a holding tank 12. The holding tank is a repository to retain a certain amount of filtered effluent for the purposes of backwashing and for the purpose of creating jets in accordance with the illustrated embodiment of the invention. Of course, an appropriate mudwell for the backwash water is provided as well as an appropriate arrangement for pumping or otherwise removing filtered effluent from holding tank 12. In accordance with standard practice, tank 10 has a lower portion B adjacent to which there is mounted a generally flat mesh element 20 having a multitude of apertures or openings through which filtered effluent can pass. The flat mesh element may be a metal screen having a somewhat normal size so that effluent filtered by the filter can pass downwardly through screen 20, but particulate material forming the filter bed itself can not pass through the screen. Underneath flat screen 20 is a coextensive underdrain cavity C which fills the lower portion B of tank 10 in accordance with standard practice for sand filters. Above screen 20 there is provided a filter bed FB formed from particulate material having an effective grain size at least about one-third greater than the openings in screen 20 and having an upper surface 30 which performs the normal filtering function. For the purposes of explanation, the lower portion of filter bed FB is referred to as lower surface 32 which is generally along screen 20. This lower surface is mentioned only for the purpose of certain orientation with respect to the description of the filtering and backwashing operation and is not necessarily in the form of an actual surface as this term is normally used in the filtering art. As so far described, effluent in tank 10 passes downwardly through filter bed FB, through flat fine mesh screen 20 into underdrain cavity C. This is the filtering operation of the filter and is performed in accordance with generally standard practice. Selection of the material forming the filter bed and its depth are known. The sand has particles as small as possible to remove the smallest practical particles in the range of less than one micron as well as large particles. In practice, one unit has a bed of approximately 9 inches and a grain size of 0.45 mm effective size with a uniformity approaching 1.5. Backwashing of the filter is the operation wherein liquid is passed from holding tank 12 through the filter bed from lower surface 32 and out of tank 10. In view of this operation, filter A has two general operations, one being the filtering cycle or run and the other being the backwashing cycle. A chemical cleaning cycle will be explained later in connection with the system illustrated in FIGS. 16 and 17. To better understand the filtering operation, FIG. 1 shows this mode of operation. Effluent, either treated or partially treated, from a waste treatment facility is introduced through conduit or pipe 40 and valve V6 when the valve is opened. This effluent to be filtered has a multitude of particles entrapped therein ranging in size from microscopic to macroscopic. Indeed, the present filter is constructed so that it can actually function satisfactorily when the incoming effluent has been passed only through a settling step, which involves removing relatively large items or particles by flowing the liquid effluent through a settling tank or another appropriate arrangement. Of course, a coagulant could be employed in the settlement treatment. In other words, effluent in pipe 40 can be effluent which has had primary treatment, or primary and secondary treatment, as these terms are known in waste water treatment field. Effluent from pipe 40 flows to box 42 having an adjustable weir 44 over which the effluent passes. Weir 44 could be a fixed weir where other filters exist in order to distribute flow evenly. Effluent overflows this weir onto an elongated trough 50 having an adjustable weir 52 extending along the side of filter tank 10, as also shown in FIG. 3. Directly below adjustable weir 52, which may have spaced velocity orifices along its outward face, is a hollow conduit 54 shown also in FIGS. 1, 3 and 6B. The upper part of conduit 54 is a splash plate 56 onto which effluent is splashed to prevent erosion of the filter bed in accordance with known properties. Of course, this splashing also increases the oxygen content of the incoming effluent. Conduit 54 has a plurality of closely spaced openings 60 having a spacing and size to create horizontally directed hydraulic scouring jets J2, to be described later. As effluent passes into the tank, it has an upper liquid level LV. By maintaining at least a certain amount of liquid above surface 30, distance or depth a, effluent entering the tank will be distributed evenly over surface 30 of filter bed FB. In underdrain cavity C there is provided an elongated double gullet 70 for accumulating filtered effluent after it has passed through the filter bed and into the underdrain cavity. The construction of this gullet is one aspect of the invention and is shown in more detail in FIGS. 2, 2A, 3, 4 and 5. Generally, the gullet includes side walls 72, 74 and bottom 75 extending along the length of the filter cell, as shown in FIG. 3. An elongated conduit 76 extends the length of gullet 70 and has an inlet or outlet connection or first end 78 and converging side walls 80, 82 which face generally toward parallel side walls 72, 74 of double gullet 70. Each wall 80, 82 has a plurality of longitudinally spaced openings 90.

During the filtering cycle or operation now being described, gullet 70 provides an appropriate outlet for filtered effluent which first enters the underdrain cavity C. This cavity is flooded to produce a hydraulic relationship between upper level LV and a lower conduit 100 which is connected to the underside of an appropriate outlet head controlling box 102 by opening valve V1. An adjustable plate 104 establishes the head in filter tank 10 and can be adjusted to change level LV when the filter is clean. Of course, when the filter is dirty, level LV rises because of the hydraulic resistance through the filter bed FB and is also a function of application rate. The position of adjustable plate 104 is preferably sufficient to allow a slight distance a for level LV over surface 30. This permits distribution of liquid uniformly over surface 30, as previously described. Of course, plate 104 could be moved downwardly so that the upper level LV of liquid is at or below surface 30. In this manner, a portion of the filter bed and all of the underdrain are flooded; however, the upper surface of the filter is exposed. Indeed, as filtering commences, level LV increases so that any such original position of plate 104 would not define the operating conditions for a prolonged time. The filtering operation continues as shown in FIG. 1 until level LV reaches level sensor 110, i.e. level L1, to create a signal at detector 112 in accordance with filter control operation. By using plate 104, level LV can be below surface 30 so that liquid penetrates the bed at high speeds to drive separated particles into the bed. At the internal level, the velocity is decreased and further lower velocity filtering takes place. In the past, flooded beds used upper sensors so that the level controlled was always above the bed.

Figure 1A:
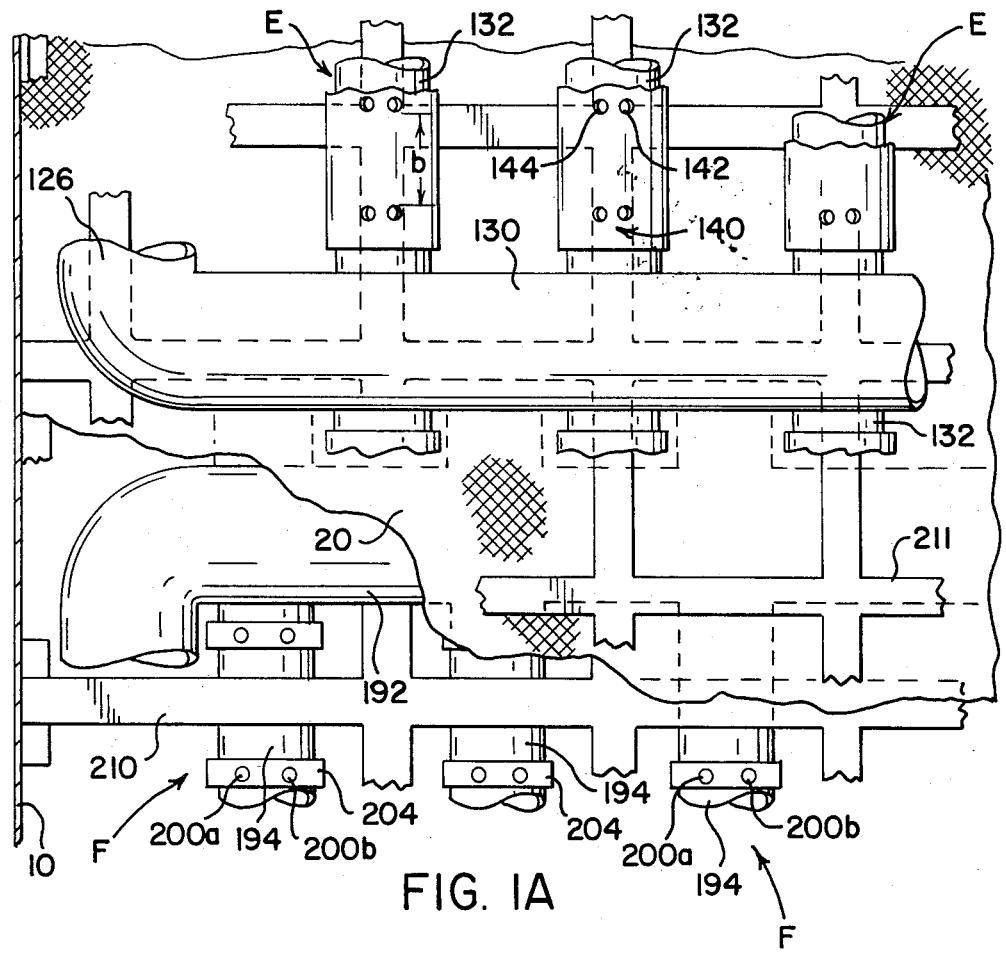
FIG. 1A is an enlarged, partially cross-sectioned, layered view taken generally along line 1A—1A of FIG. 1.
Figure 2:
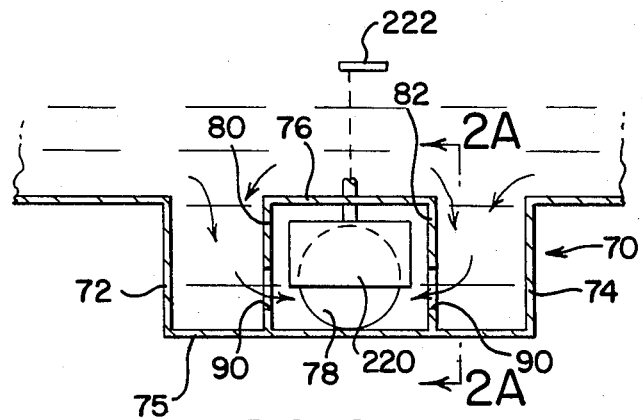
FIG. 2 is an enlarged partial view showing schematically, a double gullet constructed in accordance with the present invention.
Figure 2A:
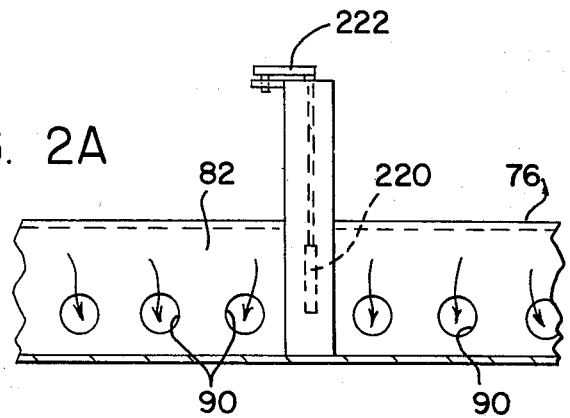
FIG. 2A is a partial side elevational view taken generally along line 2A—2A of FIG. 2.
Figure 6A:
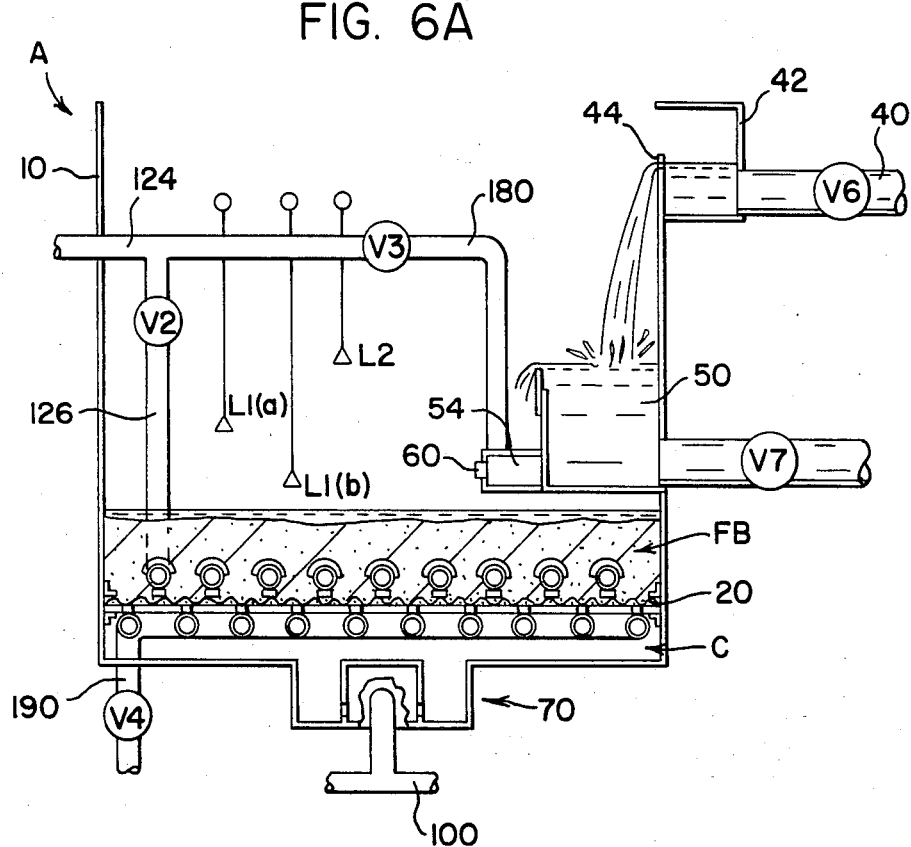
FIG. 6A is a partial side elevational view showing a modification of the level sensor employed in the preferred embodiment of the present invention.
Figure 6B:
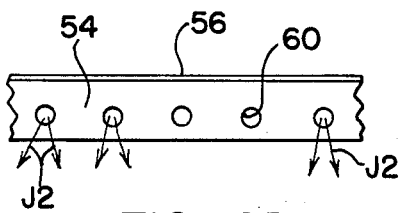
FIG. 6B is a partial, enlarged side elevational view taken generally along line 6B—6B of FIG. 6.
Figure 7:
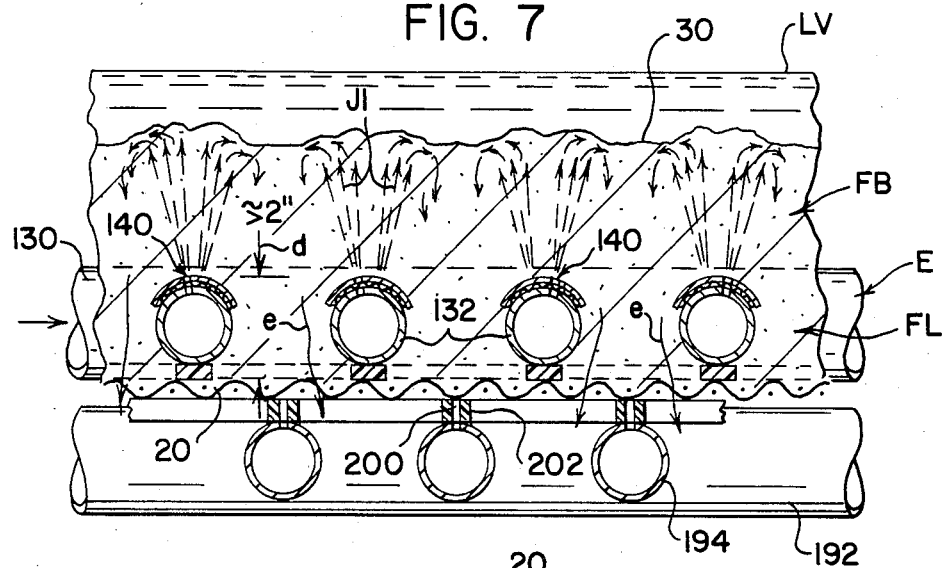
FIG. 7 is an enlarged, schematic view showing two nozzle networks employed in the preferred embodiment of the invention with the upper network operating for surface regeneration.
Figure 8:
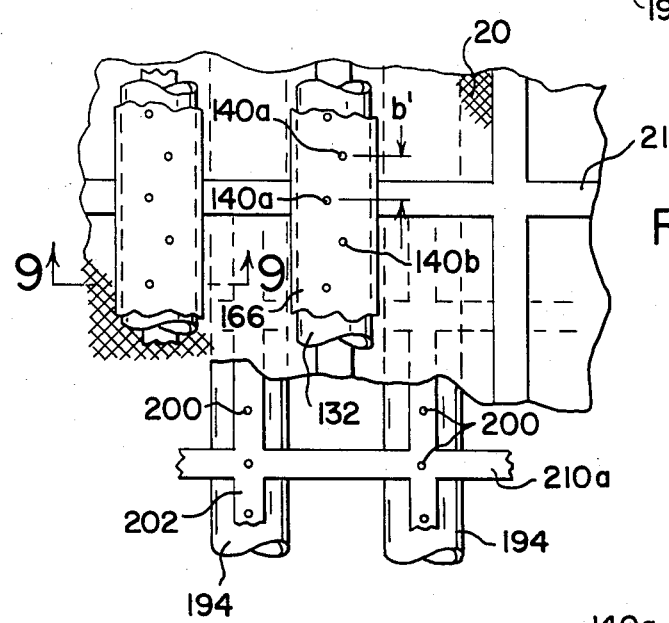
FIG. 8 is a top plan view somewhat similar to FIG. 1A and illustrating the preferred embodiment of certain nozzle networks or grids employed in the present invention with slight modifications in the nozzles.
Figure 9:
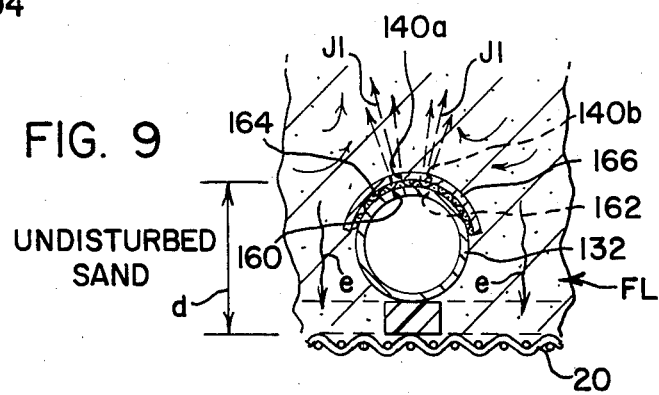
FIG. 9 is an enlarged, partially cross-sectioned view taken generally along line 9—9 of FIG. 8.

Referring now to FIG. 6, level LV has reached or exceeded the level sensor 110 for creating a detector signal in detector 112. At this time, a surface regeneration system is initiated which repeatedly folds large deleterious materials filtered at the upper surface 30 into bed FB for the purposes of capturing the materials in the bed and dissiminating it sufficiently to prolong a filtering operation. This surface regeneration system is best shown in FIGS. 1A, 6, 7 and 9. A standard pump P1 is energized to force filtered effluent from holding tank 12 into conduit 120. Valves V4, V5 are closed; however, valve V2 will be opened in a timed fashion after a signal from detector 112. Conduit 122 interconnects conduit 120 with upper distribution conduit 124 for the purposes of allowing pressurized liquid to pass valve V2 into a downwardly extending conduit 126. This conduit is shown in more detail in FIG. 1A. In this manner, an upper nozzle grid or network E above screen 20 is activated for the purposes of creating a series of closely spaced evenly distributed upwardly extending, diverging jets J1 through bed FB from a position above screen 20 to and through surface 30. The upper grid or network for the purposes of creating these hydraulic jets from filtered effluent can take a variety of forms; however in the preferred embodiment of the invention, a manifold 130 is connected to a series of parallel branches or pipes 132 having a series of axially spaced nozzles 140, each of which is formed from two separate and distinct holes or apertures 142, 144, as shown in FIG. 1A. Each jet could be formed from a single hole as shown in FIGS. 7-9. The axially spaced jet creating nozzles are spaced along branch or pipe 132 a distance b, as shown in FIG. 1A. Each of the nozzles 140 creates an upwardly diverging hydraulic jet J1 evenly distributed throughout the total bed FB to cause liquid flow in high velocity, hydraulic jet to cause movement of the sand and accompanying disruption of the particulate material in filter FB above the jets. As shown in FIGS. 8 and 9, the nozzles may include axially spaced sets of individual openings 140a, 140b spaced a distance b'. In this manner, only one orifice or opening is used for each jet. This is shown in FIG. 9 wherein the orifices 140a 140b are axially spaced along branch 132 to provide a first jet J1 at a first angle with respect to vertical and the next jet J1 at an opposite angle with respect to vertical. An appropriate structural bar or bars could be fixed over network or grid E to hold grid E in place. In this manner, the surface 30 is regenerated by the upwardly directed jets J1 for the purposes of folding dirt adjacent the upper filtering surface 30 into body of the filter bed FB. The filter bed itself causes a capturing of the filtered deleterious materials while the jets regenerate the upper surface 30 so that it remains somewhat clean even though a certain amount of larger particles are captured within the upper portion of bed FB.

Referring more specifically to FIG. 9, branch 132 is shown as having two angularly disposed orifices 160, 162 covered with a screen 164 laid along the branch or pipe. Over this screen there is provided a holddown cap or saddle 166 extending along the pipe and shown in FIG. 8. This saddle or cap includes the nozzles 140a, 140b which align with the openings or apertures 160, 162. Two or more openings could form one hydraulic jet or a single opening could form a hydraulic jet without departing from the intended spirit and scope of the invention which is to distribute a network of nozzles or openings to create a plurality of vertically upwardly flowing hydraulic jets for the purpose of regenerating surface 30 by folding in the deleterious materials periodically during the filtering cycle of the filter. Clean media is also spread over surface 30. In accordance with the invention, the openings or nozzles are spaced above screen 20 a preselected distance d, as shown in FIGS. 7 and 9. This distance is from the lower surface of filter bed FB at screen 20. In this manner, there is a lower undisturbed filter layer FL which remains intact whenever jets J1 are created to regenerate surface 30. Consequently, effluent represented by small arrows e in FIGS. 6, 7 and 9 are filtered before entering underdrain cavity C, even during and between actuations of the surface regenerating system. When liquid level LV reaches the level L1, as detected by level sensor 110, the surface regeneration system is actuated. An appropriate timer repeatedly turns on and off the fluid flow through valve V2 into the upper nozzle grid or network E. This periodic creation of upwardly directed hydraulic jets from above layer FL continues to fold in the accumulated material at surface 30 to present a clean surface periodically during the filtering operation. While this action is going on, filter bed FB continues to filter without allowing downward progression of small loosened particles since there is always a lower undisturbed filtering layer FL. There is no air pulse to allow particles to move through the filter during the filter cycle. This is a substantial advance over prior rapid sand filter and prevents contamination of the underdrain cavity during surface regeneration in the filtering cycle of the filter.

To hold certain larger particles away from surface 30 during the filtering operation, a plurality of horizontally spaced surface scouring jets J2 are created by the openings 60 in channel or conduit 54. Jets J2 are created by liquid flowing from conduit 124 through valve V3 into conduit 180 and through orifices 60, as shown in FIG. 6A. Jets J2 can operate whenever the openings 60 have been covered by liquid in tank 10. This is, in the preferred embodiment, when liquid level LV reaches height L1. This level also initiates the horizontal surface scouring jets J2. As shown at the left hand of FIG. 6, these two jet systems creating jets J1 and jets J2 can be operated in accordance with various timing functions. For instance, valve V2 can be opened for a preselected time then closed. The valve V3 is then opened for a preselected time. This alternate cycling continues as long as level LV is above level L1. In accordance with another timing or cyling arrangement, valves V3 could be turned on for a preselected time then valve V2 turned on for a preselected time. Further, both valves V2 and V3 could be opened or tuned on at the same time and remain on for a preselected time. Then this would repeat as long as the level LV remains above level L1. The rate of cycling is controlled to the desired rate needed for surface regeneration which can be varied. After the filter has accumulated sufficient solids to cause a liquid level to rise, the surface scouring by hydraulic jets continues to maintain a clean regenerated surface 30 and maintain larger particles in suspension in the body of liquid above surface 30. As shown in FIG. 6A, the surface regeneration system generally involving grid or network E could be actuated at a level L1(a) and the hyraulic jets scouring could be operated at a lower level of L1(b). In this manner, each of the jet creating systems is energized separately according to different liquid levels in tank 10. Other timing and cycling arrangements for the regenerating and hyraulic surface scouring jets can be employed either when the filter is installed or adjusted after installation. This operation of filter A continues until the filter bed has a sufficient amount of captured solids as detected by sensor L2.

Figure 10:
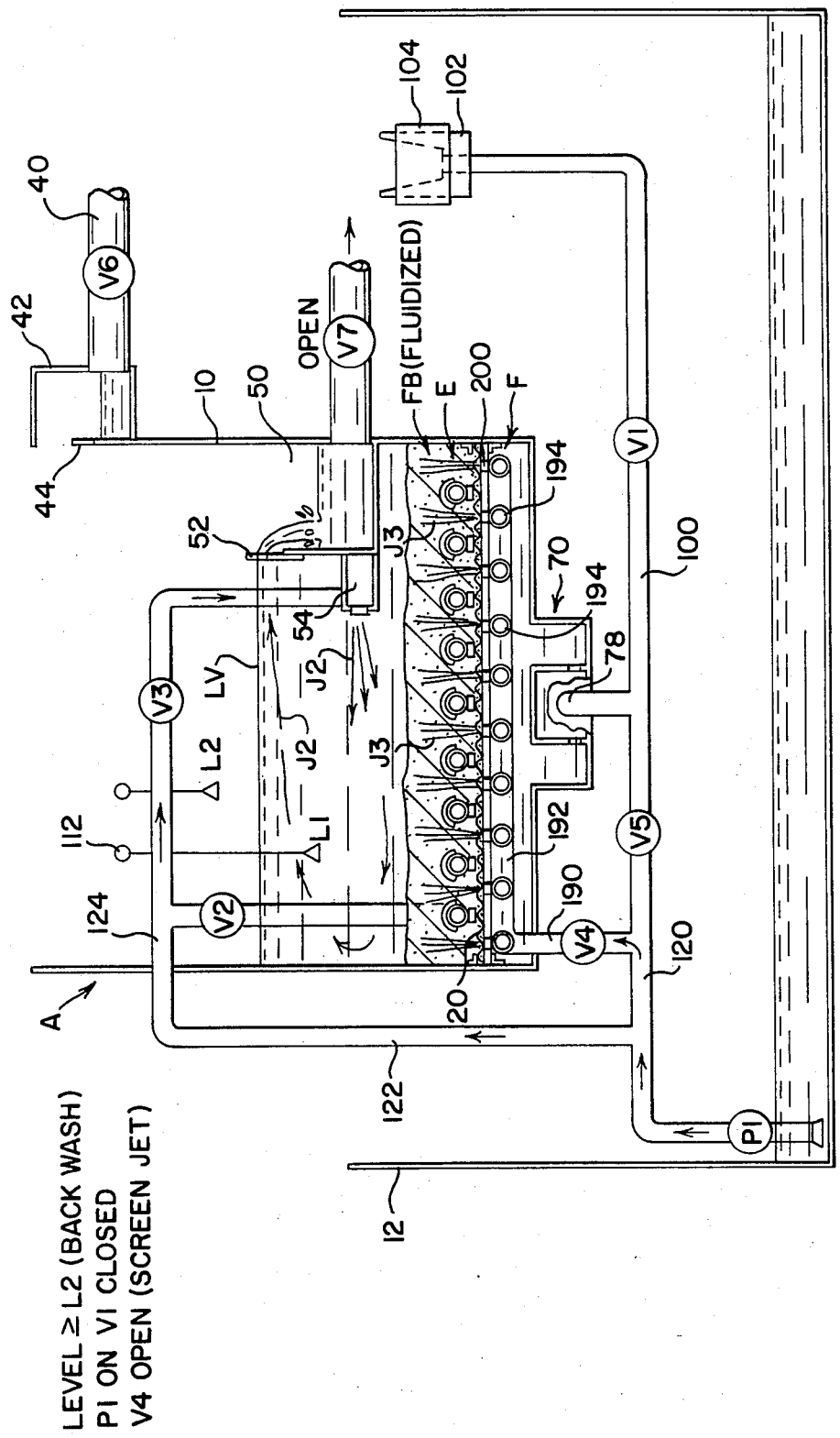
FIG. 10 is a view similar to FIGS. 1 and 6 illustrating the preferred embodiment of the present invention in the backwashing mode.
Figures 11, 12:
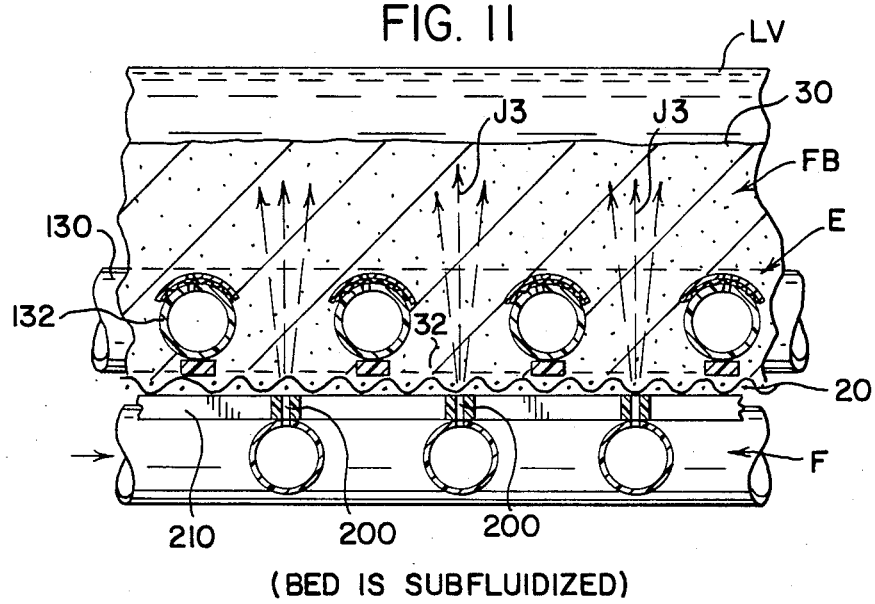
FIG. 11 is a view similar to FIG. 7 showing operation of the lower network or grid of upwardly directing nozzles for creating jets through the fluidized bed during backwashing.
FIG. 12 is a listing of certain steps performed during the backwashing operation in the illustrated embodiment.

When the level of the liquid reaches L2, filter A is shifted into the backwashing mode, as illustrated in FIG. 10. Valves V1, V6 are closed and valve V7 is opened. This allows flow from trough 50 to a mudwell, not shown. Liquid is forced from the underdrain C in a reverse direction through filter bed FB over weir 52 into trough 50 and then into the mudwell through valve V7. As soon as the level L2 is reached, which is the backwashing level, a time delay allows level LV to drain through valve V7 to the level of weir 52. Then pump P1 is energized and valve V4 is opened. At this time, valve V5 is closed, in the preferred embodiment. Opening of valve V4 energizes the lower nozzle grid or network F shown schematically in FIG. 11 and also illustrated in FIGS. 1A and 8, in separate modifications. A distribution manifold 192, best shown in FIG. 1A, includes a plurality of parallel branches or pipes 194 having a series of nozzles 200, each of which is formed from an opening in pipe 194 and extending through a support bar 202 as shown in FIG. 8. In FIG. 1A, nozzle 200 includes two openings 200a, 200b in a transverse plate 204. The support bars 202 and/or grid 210 or 210a are secured to the top of branches 194 to provide the lower support for generally flat screen 20. A modification is shown in FIG. 8 wherein nozzles 200 are formed in support grid 210a. A or holddown frame 211 is used with lower grids 120 or 210a to sandwich the screen against movement during backwashing. Various arrangements could be used for supporting the screen on lower nozzle grid or network F. The nozzles 200 (FIG. 8) or nozzles 200a, 200b (FIG. 1A) perform as high velocity bores or openings pressed against the lower surface of screen 20 as shown in FIG. 11 and in more detail in FIGS. 14 and 15. The openings are in flat bars upon which the screen rests. High velocity of liquid through branches 194 and through orifices or openings or nozzles 200 or 200a, 200b cause a high velocity jet J3 extending through screen 20, through bed FB and upwardly in tank 10. Jets J3 are evenly distributed around and through bed FB so that they are spaced between jets J1 from upper network or grid E, as shown in the upper portion of FIG. 1A and in FIG. 8. Any system for providing additiional jets in the lower portion which extend upwardly through the bed without engaging the grid network E can be envisioned for the purposes of practicing the present invention. By providing the nozzles 200 below screen 20, but not spaced therefrom, a high velocity, hydraulic jet can be created through bed FB. In the past, water jets have been created by the backwashing liquid itself and shown schematically in FIG. 13. In this figure, aperture 200' at the top of underdrain cavity C' creates an upwardly extending jet J3'. This jet is spaced downwardly from screen 20'; therefore, it impinges upon the lower surface of the screen and causes a substantial energy loss so that the flow through the screen is drastically reduced. In this prior arrangement, backwashing of the filter bed FB' folded in material above screen 20' which could accumulate and cause a crust cr, of deleterious material, as shown in FIG. 13. This crust was not dislodged even during backwashing and ultimately could decrease the filtering efficiency of the total rapid sand filter. The present invention does not have this propensity.

Figure 4:
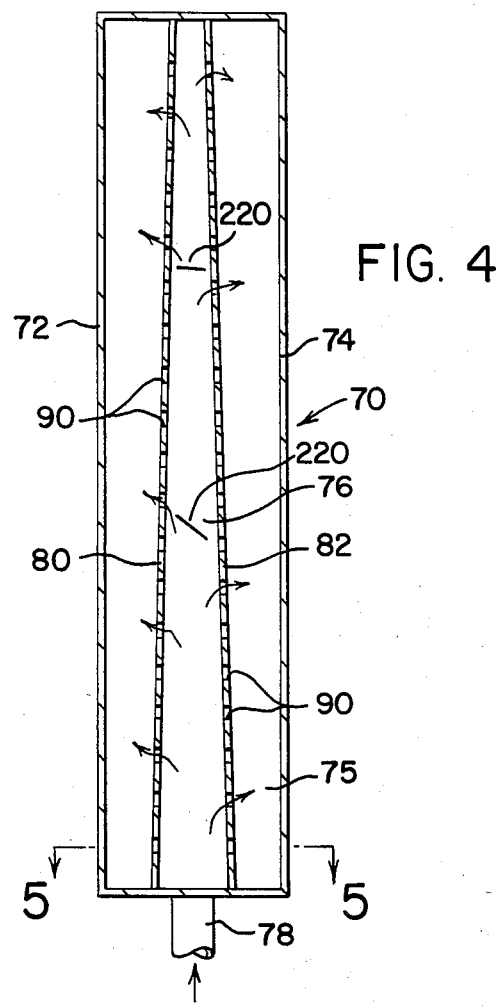
FIG. 4 is a schematic view illustrating the tapered nature of the double gullet employed in the preferred embodiment of the present invention.
Figure 5:
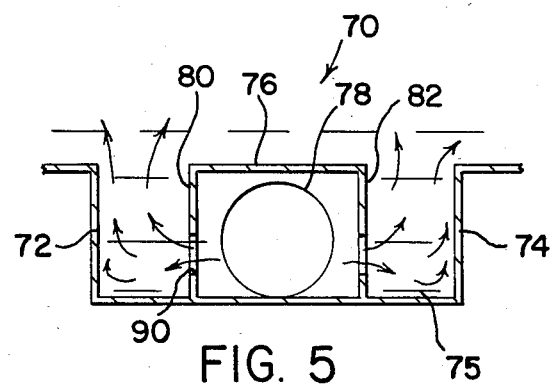
FIG. 5 is an enlarged, partial cross-sectional view taken generally along line 5—5 of FIG. 4.

After a preselected time, jets J3 have agitated and stirred the undisturbed sand layer FL shown in FIG. 9. Sometime thereafter, valve V2 is opened to create the previously mentioned upper jets J1. Thereafter, valve V5 is opened causing the screen flushing system to operate. When this occurs, fluid is pumped through conduit 120 and valve V5 to inlet 78 of gullet 70. As shown in FIGS. 4 and 5, this causes a rapid flow of liquid through orifices 90 to impinge upon walls 72, 74. By diverging walls 80, 82, the velocity pattern is equalized so that energy of the incoming liquid is dissipated to allow a general swelling of media from underdrain cavity C through the filter bed. This swelling or fluidizing is caused by an appropriate flow rate; therefore, the particles within filter bed are fluidized by the upward velocity flow of backwashing liquid. By dissipation of energy in the gullet through modifications shown in FIGS. 4 and 5, the upward flow is uniform throughout the total filter bed and is not concentrated at certain areas which will cause an initial blowout of the bed during the backwashing operation. The jets J2 from conduit 54 are also used during backwashing to enhance the velocity components within the liquid level so that the dirt is held in suspension and removed by the backwashing operation in an efficient manner. As shown in FIG. 10, jets or streams J2 extend to the wall of tank 10 and come back toward weir 52. This provides for sweeping action to remove particle ladened water. This reversal of jets J2 also occurs during filtering. See FIG. 6. The combined operation of jet networks E and F, together with the fluidizing in the screen flushing and backwash operation, causes substantial agitation and dislodging of contaminants and filtered particles from the sand. Also, the velocities involved in the jets and the fluidizing velocity of the incoming backwash water prevents stratification of the particles forming filter bed FB.

Referring now to FIGS. 2, 2A, 3 and 4, the double gullet 70 extends along the filter bed into different bed areas. By converging walls 80, 82, as shown in FIG. 4, reduction of high velocity concentrations is possible. In addition, the diameters of holes 90 can be selected to cause such modulation. Tuning of fluid flow from gullet 70 through the filter during backwashing can be done by another aspect of the invention. A plurality of energy absorbing vanes 220 can be interposed within conduit 76 at longitudinally spaced positions. By rotating these vanes with handles 222, shown in FIGS. 2 and 3, the actual vertical flow of liquid from the gullet through the filter can be tuned to a substantial degree. By the tapering of inner conduit 76, modifying the holes along the length of the gullet, by energy absorbing vanes, the flow during backwashing is at a uniform upward velocity. This velocity is uniform throughout the total bed and prevents abrupt blowout at preselected areas of the filter bed or inadequate cleaning.

Referring now to FIG. 12, the general operation sequence during backwashing is set forth in one preferred example. Upon reaching level L2, pump P1 is energized after draining the cell and valve V4 is opened. This initiates the lower jets, as shown in FIG. 11. After a preselected time, the upper jets J1 are actuated by opening valve V2. This action is shown in detail in FIG. 7. Thereafter, the screen flushing and fluidizing flow is initiated by opening valve V5. Jets J1, J2 and J3 are operating in various sequences during the backwashing operation. After a preselected time, the backwashing cycle is terminated and the filter is shifted back into the filtering operation as shown schematically in FIG. 1.

After several cycles of backwashing, which may be a preselected count or otherwise determined automatically or selectively by an operator, it is generally accepted practice to clean the media within the filter bed by appropriate chemicals. Various chemicals are used such as those mentioned in U.S. Pat. No. 4,032,443 which is incorporated by reference for background information. In that prior art, the chemicals are injected into the underdrain cavity and forced upwardly into the bed.

Figure 16:
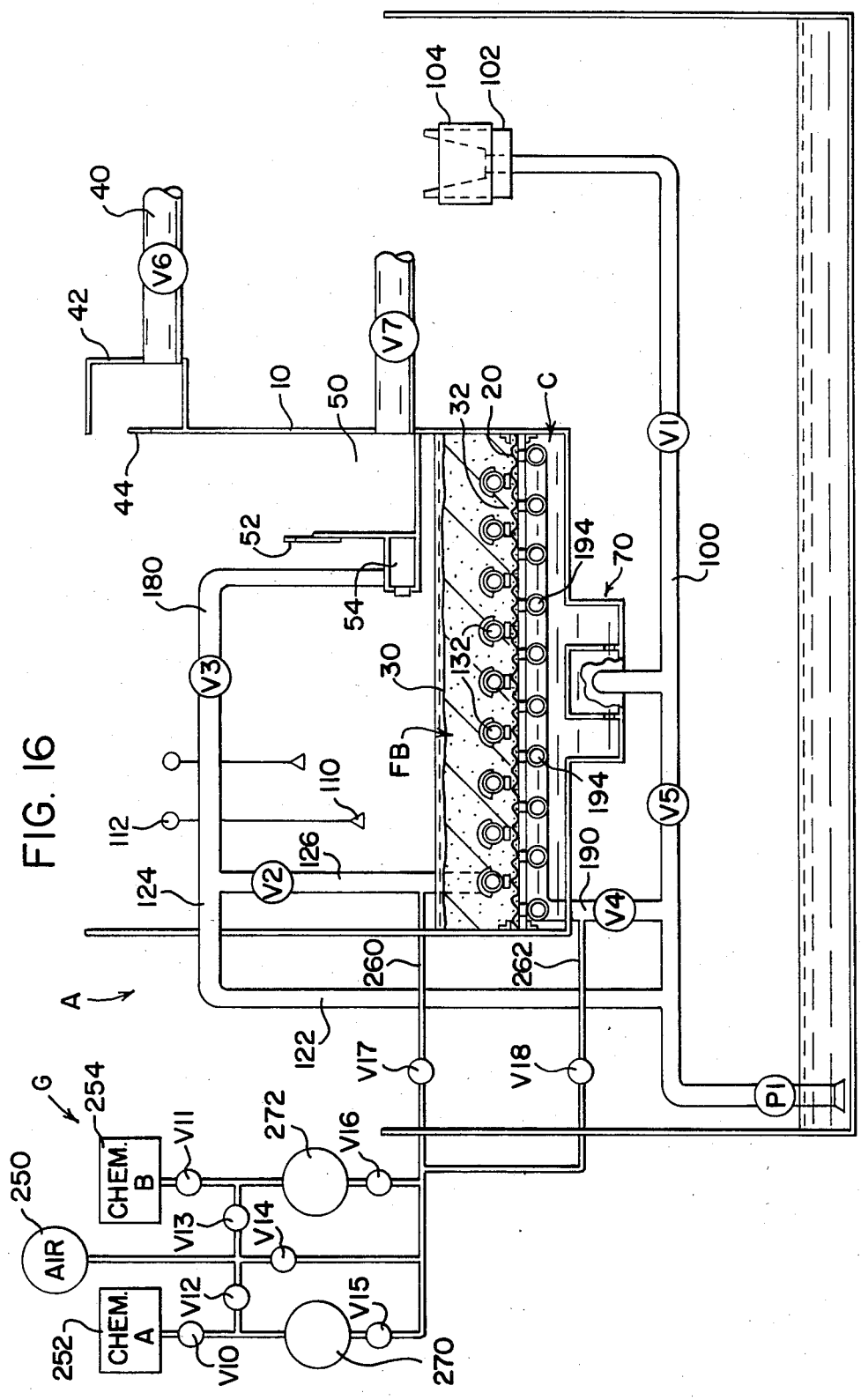
FIG. 16 is a view similar to FIGS. 1, 6 and 10 where the preferred embodiment of the filter is provided with a novel chemical cleaning system; and, FIG. 17 is a listing of steps and procedures employed in operation of the chemical cleaning system illustrated in FIG. 16.

It has been found that effective cleaning of the film from the media often involved two separate types of material such as an oxidizing agent (Sodium Hypochloride) and an appropriate wetting agent (surfactant). When these chemicals are mixed together they have a tendency to react in many instances; therefore, their effectiveness is diminished by mixing them and injecting them into the underdrain. In accordance with another aspect of the present invention the filter A, as so far described, is provided with a chemical cleaning system G, as shown in FIG. 16. This system is schematically illustrated as including an air supply 250 and two chemical tanks 252, 254, together with a series of valves V10-V18 and interconnecting piping. The outlet lines 260, 262 of system G are connected with the conduits 126, 190, respectively. Thus, chemical can be injected into either the upper nozzle network or the lower nozzle network according to the desires of the engineer setting up chemical cleaning system G. This system employs the upper and lower nozzles for the purposes of mixing chemicals A and B directly in the bed itself so that they react in the bed to increase their effectiveness in the chemical cleaning operation. Although a variety of steps could be followed, in accordance with the preferred embodiment of the present invention, an oxidizing agent is contained in tank 254 and a surfactant to reduce surface tension on the particles is stored in tank 252. During the cleaning operation, pump P1 is energized. Valves V2 and V4 are opened. This creates upwardly directed jets J1 and J3 to break up the contaminated bed. Thereafter, P1 is deenergized and V2 and V4 are closed. Air from tank 250 is blown through the bed by opening valve V14 and valves V17, V18. After the jets have agitated and fractured the bed, air is directed through the bed for the purposes of expanding the bed and dislodging the attached particles. Then the surfactant from tank 252 is directed into bed FB by first filling accumulator 270 with the appropriate measure of surfactant. Thereafter, valves V12 and V15 are opened. This drives the surfactant from accumulator 270 to valves V17, V18. First valve V18 is opened so that the surfactant is forced upwardly through the fractured bed. Then, valve V17 is opened. In this manner, the wetting agent or surfactant is first mixed into the bed. The liquid wetting agent will not flow from tank 10; therefore, it accumulates and coats the various particles within the bed. Water is retained in the bed at a certain level so that the liquid remains in the bed without draining downwardly into the underdrain cavity. Thereafter, the oxidizing agent from tank 254 is loaded into accumulator 272. Air is then applied to accumulator 272 for forcing the oxidizing agent first through line 262 and then through line 260 in accordance with the same operating characteristics as used with the surfactant. The surfactant has coated the particles at least by reducing the surface tension; therefore, the oxidizing agent can rapidly and uniformly slide into and fill the various interstices for the purposes of chemically reacting with any deleterious material accumulating on the particles forming the particulate filter bed. After this has taken place, an appropriate soak time is allowed so that the oxidizing agent can oxidize the grease accumulating on the particles. This soak time can be controlled automatically or can be done manually. After the soaking time, the lower jets are turned on for a short time and then turned off. Thereafter, the upper jets are turned on and turned off. This is followed by a further soaking time which is then followed by a standard backwash of the filter. By utilizing this type of chemical clean, particles are wetted by the surfactant preparatory to actual injection into the filter bed of the oxidizing agent. This sequence prevents interaction between the two chemicals at some external mixing point which has been a problem in the past. In addition, by employing the two sets of nozzles, the chemicals can be injected directly into the filter bed in a manner to be pumped upwardly through the filter bed in accordance with the networks E, F previously described. The operating sequence for the preferred embodiment of the chemical washing sequence mentioned above is set forth in FIG. 17.

Various manual and automatic controls can be used for the chemical clean as well as for the various cycling of the different operating characteristics during filtering, surface regeneration, hydraulic surface scouring and backwashing as described. By employing the filter so far described, the waste effluent is more effectively cleaned resulting in a reduction in the biological treatment, an improvement in subsequent disinfectant processing and a general environmental improvement in the quality of effluent deposited in streams and lakes.

Having thus defined the invention, the following is claimed:

1. Method of operating a waste effluent filter including a tank having a lower portion; a generally flat fine mesh element supported adjacent said lower portion and having a multitude of apertures; an underdrain cavity adjacent said lower portion and under said fine mesh element and generally coextensive with said fine mesh element; a filter bed of particulate material having an upper surface; a parallel lower surface on said generally flat fine mesh element, a generally uniform depth between said fine mesh element and said upper surface and an effective particle size at least greater than the size of said apertures of said fine mesh elements; means for directing effluent into said filter above said upper surface; and, means for directing filtered effluent from said underdrain cavity, said method comprising the steps of:
   (a) allowing liquid in said tank to increase to a level substantially above said upper surface during filtering; and,
   (b) during such filtering, periodically regenerating said upper surface by folding filtered material at said upper surface into said filter bed by directing a plurality of evenly distributed hydraulic jets upwardly through said filter bed from a position in said bed and above said flat fine mesh element a given distance whereby a lower filtering layer of said bed remains undisturbed between said jets and said fine mesh element while said upper surface is regenerated.

2. A method of operating a waste effluent filter as defined in claim 1 including the additional step of:
   (c) periodically directing a plurality of liquid jets horizontally across said upper surface.

3. A method as defined in claim 2 including the additional step of:
   (d) repeating steps (a) and (c) during filtering of effluent by said filter.

4. A method as defined in claim 2 including the additional steps of:
   (d) sensing a given level of liquid in said tank; and,
   (e) initiating steps (b) and (c) in response to said sensed level.

5. A method as defined in claim 1 including the additional steps of:
   (c) sensing a given level of liquid in said tank; and,
   (d) initiating step (b) in response to said sensed level.

6. A method as defined in claim 5 including the additional steps of:
   (e) sensing a maximum level of liquid above said upper surface;
   (f) backwashing said filter by forcing liquid through said bed from said lower surface to said upper surface at a rate to fluidize said bed;
   (g) creating a plurality of hydraulic jets extending from said fine mesh element through said fluidized bed during backwashing whereby said undisturbed layer is agitated during backwashing.

7. Method of chemically cleaning a waste effluent filter including a tank having a lower portion; a generally flat fine mesh element supported adjacent said lower portion and having a multitude of apertures; an underdrain cavity adjacent said lower portion and under said fine mesh element and generally coextensive with said fine mesh element; a filter bed of particulate material having an upper surface, a parallel lower surface on said generally flat fine mesh element, a generally uniform depth between said fine mesh element and said upper surface and an effective particle size at least greater than the size of said apertures of said fine mesh element; means for directing effluent into said filter above said upper surface; and, means for directing filtered effluent from said underdrain cavity; said method comprising the steps of:
   (a) stopping filtering cycle of said filter;
   (b) forcing a liquid surfactant or wetting agent directly into said bed from a plurality of jets separate from said underdrain;
   (c) forcing a liquid oxidizing agent directly into said bed from a plurality of jets separate from said underdrain;
   (d) allowing said bed to soak while said agents react in said bed;

(e) directing hydraulic jets upwardly through said filter bed whereby said bed is agitated;

(f) expanding said bed by upwardly traveling liquid to create an upper level for said expanded bed; and, (g) overflowing liquid from said tank from above said upper level of said expanded bed as said agents are removed by said upwardly traveling liquid until said agents are substatially removed from said expanded bed.

8. A method as defined in claim 7 including the additional step of:

(h) blowing a gas upwardly through said filter bed after said bed is expanded and generally before said agents are forced into said filter bed.

9. In a waste effluent filter including a tank having a lower portion; a generally flat fine mesh element supported adjacent said lower portion and having a multitude of apertures; an underdrain cavity adjacent said lower portion and under said fine mesh element and generally coextensive with said fine mesh element; a filter bed of particulate material having an upper surface, a parallel lower surface on said generally flat fine mesh element, a generally uniform depth between said fine mesh element and said upper surface and an effective particle size at least greater than the size of said apertures of said fine mesh element; means for directing effluent into said filter above said upper surface; and, backwash means for directing filtered effluent from said underdrain cavity, the improvement comprising: jet creating means for selectively creating a plurality of upwardly directed hydraulic jets evenly distributed throughout said filter bed during filtering of said effluent through said filter bed to regenerate said upper surface periodically, said jet creating means including a plurality of nozzles evenly distributed in said bed, substantially below said upper surface and above said flat fine mesh element a selected distance to retain a lower layer of said bed generally undisturbed during surface regeneration by operation of said hydraulic jets.

10. The improvement as defined in claim 9 wherein said undisturbed distance is at least about 2.0 inches.

11. The inprovement as defined in claim 9 wherein said jet creating means includes means for intermittently energizing said hydraulic jets whereby filtered matter on said upper surface is periodically folded into said bed during filtering of said effluent.

12. The improvement as defined in claim 11 including level sensing means for sensing a preselected level of liquid above said upper surface and means for energizing said jet creating means when the level of said liquid is sensed by said level sensing means.

13. The improvement as defined in claim 12 including an hydraulic means for creating a plurality of horizontal liquid jets at a given location above said upper surface of said bed and evenly distributed across said bed and means for energizing said hydraulic means when liquid above said filter bed exceeds a given level higher than said given location.

14. The improvement as defined in claim 9 including an hydraulic means for creating a plurality of horizontal liquid jets at a given location above said upper surface of said bed and evenly distributed across said bed and means for energizing said hydraulic means when liquid above said filter bed exceeds a given level higher than said given location.

15. The improvement as defined in claim 14 including means for sensing a preselected level of liquid above said upper surface and above said given location and means for energizing said hydraulic means when the level of said liquid is sensed by said level sensing means.

16. The improvement as defined in claim 14 including level sensing means for sensing a predetermined level of liquid above said upper surface and control means for intermittently energizing said jet creating means and said hydraulic means when said predetermined level is sensed.

17. The improvement as defined in claim 14 including backwash means for forcing filtered liquid into said underdrain cavity, through said fine mesh element, through said filter bed from said lower surface to said upper surface at a flow rate sufficient to expand said filter bed to provide said bed with a second expanded upper level and then from said tank.

18. The improvement as defined in claim 17 including means for actuating said hydraulic means during operation of said backwashing means and means for locating said hydraulic means to create said horizontal jets above said expanded upper level.

19. The improvement as defined in claim 17 including means below, but at, said fine mesh element for creating a plurality of evenly distributed hydraulic cleaning jets from said fine mesh element through said lower layer of said bed during operation of said backwash means whereby said hydraulic cleaning jets extend upwardly through said bed during backwashing.

20. The improvement as defined in claim 19 wherein said means for creating the hydraulic cleaning jets includes a plurality of nozzles facing toward said bed from immediately below said fine mesh element.

21. The improvement as defined in claim 20 wherein said fine mesh element is a generally flat metal screen.

22. The improvement as defined in claim 19 wherein said fine mesh element is a generally flat metal screen.

23. The improvement as defined in claim 14 wherein said fine mesh element is a generally flat metal screen.

24. The improvement as defined in claim 14 wherein said filtered effluent directing means includes a conduit connecting said underdrain cavity with a receptacle having an overflow plate and means for adjusting the vertical position of said overflow plate to control the minimum liquid level in said tank.

25. The improvement as defined in claim 9 wherein said fine mesh element is a generally flat metal screen.

26. The improvement as defined in claim 9 wherein said backwash means includes an elongated gullet extending in said underdrain cavity and generally across said tank, said gullet including a recessed channel having two spaced side walls, a central conduit with a first end, side walls located laterally inwardly of said gullet side walls and with apertures facing said gullet side walls and means for forcing filtrate into said conduit at said first end whereby said filtrate flows outwardly against said gullet side walls and then into said underdrain cavity and wherein said lateral side walls of said conduit converge in a direction from said first end.

27. The improvement as defined in claim 26 including at least one adjustable energy dissipating vane in said conduit and spaced from said first end.

28. The improvement as defined in claim 27 including means external of said filter for adjusting said energy dissipating vane.

29. The improvement as defined in claim 9 wherein said backwash means includes an elongated gullet extending in said underdrain cavity and generally across said tank, said gullet including a recessed channel having two spaced side walls, a central conduit with a first end, side walls located laterally inwardly of said gullet side walls and with apertures facing said gullet side walls and means for forcing filtrate into said conduit at said first end whereby said filtrate flows outwardly against said gullet side walls and then into said underdrain cavity and further including at least one adjustable energy dissipating vane in said conduit and spaced from said first end.

30. The improvement as defined in claim 29 including means external of said filter for adjusting said energy dissipating vane.

31. The improvement as defined in claim 9 wherein said filtered effluent directing means includes a conduit connecting said underdrain cavity with a receptacle having an overflow plate and means for adjusting the vertical position of said overflow plate to control the minimum liquid level in said tank.

32. In a waste effluent filter including a tank having a lower portion; a generally flat fine mesh element supported adjacent said lower portion and having a multitude of apertures; an underdrain cavity adjacent said lower portion and under said fine mesh element and generally coextensive with said fine mesh element; a filter bed of particulate material having an upper surface, a parallel lower surface on said generally flat fine mesh element, a generally uniform depth between said fine mesh element and said upper surface and an effective particle size at least greater than the size of said apertures of said fine mesh element; means for directing effluent into said filter above said upper surface; and, means for directing filtered effluent from said underdrain cavity, the improvement comprising: an hydraulic means for creating a plurality of horizontal liquid jets at a given location above said upper surface of said bed and evenly distributed across said bed and means for energizing said hydraulic means when liquid above said filter bed exceeds a given level higher than said given location.

33. The improvement as defined in claim 32 including means for sensing a preselected level of liquid above said upper surface and above said given location and means for energizing said hydraulic means when the level of said liquid is sensed by said level sensing means.

34. The improvement as defined in claim 32 including backwash means for forcing filtered liquid into said underdrain cavity, through said fine mesh element, through said filter bed from said lower surface to said upper surface at a flow rate sufficient to expand said filter bed to provide said bed with a second expanded upper level and then from said tank.

35. The improvement as defined in claim 34 including means for actuating said hydraulic means during operation of said backwash means and means for locating said hydraulic means to create said horizontal jets above said expanded upper level.

36. The improvement as defined in claim 35 including means below, but at, said fine mesh element for creating a plurality of evenly distributed hydraulic cleaning jets from said fine mesh element through said lower layer of said bed during operation of said backwash means whereby said hydraulic cleaning jets extend upwardly through said bed during backwashing.

37. The improvement as defined in claim 36 wherein said means for creating the hydraulic cleaning jets includes a plurality of nozzles facing toward said bed from immediately below said fine mesh element.

38. In a waste effluent filter including a tank having a lower portion; a generally flat fine mesh element supported adjacent said lower portion and having a multitude of apertures; an underdrain cavity adjacent said lower portion and under said fine mesh element and generally coextensive with said fine mesh element; a filter bed of particulate material having an upper surface, a parallel lower surface on said generally flat fine mesh element, a generally uniform depth between said fine mesh element and said upper surface, a lower layer of particulate material immediately above said fine mesh element and substantially below said upper surface, and an effective particle size at least greater than the size of said apertures of said fine mesh element; means for directing effluent into said filter above said upper surface; and, means for directing filtered effluent from said underdrain cavity, backwash means for forcing filtered liquid into said underdrain cavity, through said fine mesh element, through said filter bed from said lower surface to said upper surface at a flow rate sufficient to expand said filter bed and then from said tank, the improvement comprising: means separate from said backwashing means and below said fine mesh element for creating a plurality of evenly distributed hydraulic cleaning jets separate from said backwashing means, initiated at said fine mesh elements, extending upwardly through said fine mesh element and passing through said lower layer of said bed during operation of said backwash means whereby said separate hydraulic cleaning jets and forced filtered liquid separately flush said lower layer from said fine mesh element while said filter is being backwashed.

39. The improvement as defined in claim 38 wherein said fine mesh element is a generally flat metal screen.

40. In a waste effluent filter including a tank having a lower portion; a generally flat fine mesh element supported adjacent said lower portion and having a multitude of apertures; an underdrain cavity adjacent said lower portion and under said fine mesh element and generally coextensive with said fine mesh element; a filter bed of particulate material having an upper surface, a parallel lower surface on said generally flat fine mesh element, a generally uniform depth between said fine mesh element and said upper surface and an effective particle size at least greater than the size of said apertures of said fine mesh element; means for directing effluent into said filter above said upper surface; and, means for directing filtered effluent from said underdrain cavity through said bed during backwashing, the improvement comprising: a first set of upper nozzles in said bed and spaced only slightly above said fine mesh element and evenly distributed throughout said filter bed, a second set of lower nozzles near to, but below, said fine mesh element and also evenly distributed through said filter bed, said second set of nozzles being separate from said filtered effluent directing means, means for periodically forcing liquid through said upper nozzles whereby the upper surface of said bed is periodically regenerated at least during filtering and means for forcing liquid through said separate, lower nozzles during backwashing of said filter by liquid filtrate from said underdrain cavity whereby said bed is agitated.

41. The improvement as defined in claim 40 including means for forcing chemical cleaning substance through at least some of said nozzles during cleaning of said filter bed.

42. In a waste effluent filter including a tank having a lower portion; a generally flat fine mesh element supported adjacent said lower portion and having a multitude of apertures; an underdrain cavity adjacent said lower portion and under said fine mesh element and generally coextensive with said fine mesh element; a filter bed of particulate material having an upper surface, a parallel lower surface on said generally flat fine mesh element, a generally uniform depth between said fine mesh element and said upper surface of said bed and an effective particle size at least greater than the size of said apertures of said fine mesh element; means for directing effluent into said filter above said upper surface; and, means for directing filtered effluent from said underdrain cavity through said bed for backwashing during times between filtering by said bed, the improvement comprising: a first network of upwardly facing nozzles evenly spaced throughout said bed, substantially below said upper surface of said bed and above said flat fine mesh element a selected distance to retain a lower layer of said bed generally undisturbed when jets are directed through the upper portion of said bed above said nozzles, means for forcing filtered effluent through said nozzles of said first network in a series of bed surface regenerating cycles during filtering by said bed between backwashing of said total bed by a means for forcing liquid from said underdrain upwardly through said total bed including said retained lower layer.

43. The improvement as defined in claim 42 including a second network of upwardly facing nozzles evenly spaced throughout said bed below said fine mesh element and means for forcing filtered effluent through said nozzles of said second network while said filter bed is being backwashed.

44. The improvement as defined in claim 43 wherein said nozzles of said second network are generally against said fine mesh element.

45. The improvement as defined in claim 44 wherein said fine mesh element is a generally flat metal screen.

* * * * *